US012716854B2

(12) United States Patent
Brady et al.

(10) Patent No.: US 12,716,854 B2
(45) Date of Patent: Aug. 25, 2026

(54) DETERMINING TILT ANGLE OF SUBSTRATE STRUCTURES UTILIZING ANGULAR FOURIER DECOMPOSITION OF SCATTERING IMAGES

(71) Applicant: Applied Materials, Inc., Santa Clara, CA (US)

(72) Inventors: Alexander Buhse Brady, San Jose, CA (US); Tusar Ranjan Swain, San Jose, CA (US); Vlad Kudriashov, San Jose, CA (US); Zhenhua Ge, South Lyon, MI (US)

(73) Assignee: Applied Materials, Inc., Santa Clara, CA (US)

( * ) Notice: Subject to any disclaimer, the term of this patent is extended or adjusted under 35 U.S.C. 154(b) by 265 days.

(21) Appl. No.: 18/491,587

(22) Filed: Oct. 20, 2023

(65) Prior Publication Data

US 2025/0130183 A1 Apr. 24, 2025

(51) Int. Cl.
*G01N 23/201* (2018.01)
*G01N 23/2055* (2018.01)

(52) U.S. Cl.
CPC ....... *G01N 23/201* (2013.01); *G01N 23/2055* (2013.01); *G01N 2223/051* (2013.01); *G01N 2223/1016* (2013.01); *G01N 2223/304* (2013.01); *G01N 2223/401* (2013.01)

(58) Field of Classification Search
None
See application file for complete search history.

(56) References Cited

U.S. PATENT DOCUMENTS 9,885,962 B2 * 2/2018 Veldman ............. G03F 7/70633
2010/0241396 A1 * 9/2010 Rodenburg ........ G01N 21/4795 702/167
2013/0308750 A1 * 11/2013 Ishii ..................... A61B 6/4464 378/36
2015/0340201 A1 * 11/2015 Wu ......................... H01J 37/04 250/307
2017/0102623 A1 * 4/2017 Pisarenco ............ G01N 23/201
2017/0213365 A1 * 7/2017 Koehler ............... G01N 23/041
2018/0350699 A1 * 12/2018 Gellineau ............... H10P 74/23
2019/0049602 A1 * 2/2019 Hench .................. G01N 23/201
2019/0323976 A1 * 10/2019 Vinshtein ......... G01N 23/20091
2020/0041426 A1 * 2/2020 Thompson ........... G01N 23/201
2020/0333267 A1 * 10/2020 Ito ........................ G01N 23/201
2021/0063329 A1 * 3/2021 Kuznetsov ............. G01N 23/20
2021/0262950 A1 * 8/2021 Blasenheim ........ G03F 7/70625

* cited by examiner

*Primary Examiner* — David J Makiya
*Assistant Examiner* — Soorena Kefayati
(74) *Attorney, Agent, or Firm* — Lowenstein Sandler LLP

(57) ABSTRACT

A method includes receiving, by a processing device, a first small angle scattering image of a substrate. The substrate includes a number of structures oriented at a first angle relative to a base of the substrate. The first small angle scattering image of the substrate is collected at a second angle of incidence of radiation relative to the base of the substrate, different than the first angle. The method further includes determining a first-order Fourier term associated with the first small angle scattering image by performing angular Fourier decomposition of the first small angle scattering image. The method further includes determining a value of the first angle based on the first-order Fourier term.

20 Claims, 5 Drawing Sheets

DETERMINING TILT ANGLE OF SUBSTRATE STRUCTURES UTILIZING ANGULAR FOURIER DECOMPOSITION OF SCATTERING IMAGES

TECHNICAL FIELD

The present disclosure relates to methods and systems associated with determining a tilt angle of structures of a substrate. More particularly, the present disclosure relates to methods and systems for determining a tilt angle of structures of a substrate utilizing angular Fourier decomposition of scattering images of the substrate.

BACKGROUND

Substrates may be produced via substrate processing procedures utilizing substrate processing equipment. Substrates may include structures upon a substrate base, e.g., deposited structures, etched structures, etc. Structures may extend from the substrate base at a tilt angle. Determining the tilt angle of the structures relative to the substrate may be performed by making one or more measurements of the substrate including the structures.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In some aspects of the present disclosure, a method includes receiving, by a processing device, a first small angle scattering image of a substrate. The substrate includes a number of structures oriented at a first angle relative to a base of the substrate. The first small angle scattering image of the substrate is collected at a second angle of incidence of radiation relative to the base of the substrate, different than the first angle. The method further includes determining a first-order Fourier term associated with the first small angle scattering image by performing angular Fourier decomposition of the first small angle scattering image. The method further includes determining a value of the first angle based on the first-order Fourier term.

In another aspect of the present disclosure, a system includes memory and a processing device coupled to the memory. The processing device is configured to receive a first small angle scattering image of a substrate. The substrate includes a number of structures oriented at a first angle relative to a base of the substrate. The first small angle scattering image of the substrate is collected at a second angle of incidence of radiation relative to the base of the substrate, different than the first angle. The processing device is further configured to determine a first-order Fourier term associated with the first small angle scattering image by performing angular Fourier decomposition of the first small angle scattering image. The processing device is further configured to determine a value of the first angle based on the first-order Fourier term.

In another aspect of the present disclosure, a non-transitory machine-readable storage medium stores instructions which, when executed, cause a processing device to perform operations including receiving a first small angle scattering image of a substrate. The substrate includes a number of structures oriented at a first angle relative to a base of the substrate. The first small angle scattering image of the substrate is collected at a second angle of incidence of radiation relative to the base of the substrate, different than the first angle. The operations further include determining a first-order Fourier term associated with the first small angle scattering image by performing angular Fourier decomposition of the first small angle scattering image. The operations further include determining a value of the first angle based on the first first-order Fourier term.

BRIEF DESCRIPTION OF THE DRAWINGS

The present disclosure is illustrated by way of example, and not by way of limitation in the figures of the accompanying drawings.

DETAILED DESCRIPTION

Figure 1:
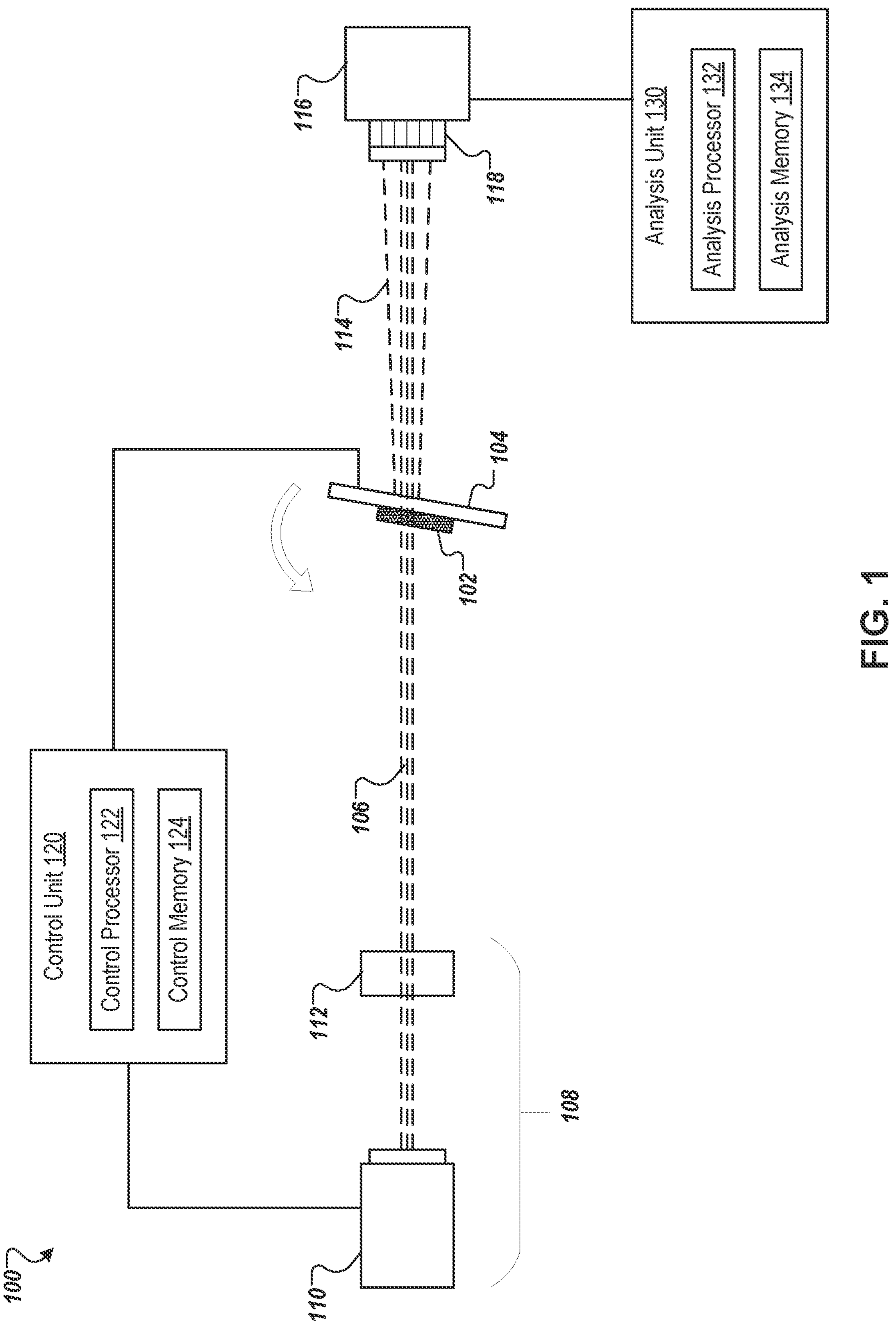
FIG. 1 is a schematic diagram of a system for measurement and analysis of X-ray scattering from a substrate, according to some embodiments.

Described herein are technologies related to measurement of structures upon a substrate. The substrate may be a semiconductor device. The substrate may have structures upon it. The structures may extend nominally perpendicular to a base of the substrate. Measuring a true angle between structures and the substrate base may be performed via a small angle X-ray scattering method. Details of asymmetries of a scattering pattern from a small angle X-ray scattering pattern may provide indications of an angle between structures upon a surface of a substrate and the base of the substrate.

In some systems, a small angle X-ray scattering (SAXS) method may be utilized in determining an angle between structures and a substrate base. Scattering patterns may be used in determining the angle between structures and the substrate base. Total intensity of a scattering pattern may be used in determining the angle. Total intensity of a portion of a scattering pattern may be used in determining the angle. Total intensity of the scattering pattern outside a masked portion may be used in determining the angle.

In some systems, SAXS measurements may include providing X-rays to pass through the substrate of interest. Some X-ray energy provided to the substrate is scattered into a cone. The energy is collected on the opposite side of the substrate from the X-ray source. The collected X-ray energy is used to determine a tilt angle of structures of the substrate.

In some systems, SAXS measurement may be performed from a number of X-ray angles of incidence (e.g., as measured compared to perpendicular to the substrate base). A scan may be performed along a first dimension. The scan may include a number of measurements, each at a different incidence angle of the X-rays. For example, a measurement may be taken every 0.1 degrees, every 0.2 degrees, or the like, from a target minimum angle to a target maximum angle. Scattering data may be generated from a large number of angles. Scattering data may be generated from 15-40 angles along the first scanning dimension, for example. A further scan may be performed along a second direction. The second direction may be orthogonal to the first direction. Scattering data may further be generated at a number of incidence angles in the second scan dimension.

A pattern of scattering intensity may be utilized to determine an angle between structures and the substrate. A curve of intensity for each dimension of scan may be generated. A local maximum of intensity as a function of incidence angle may be used to indicate an angle of structures on the surface of the substrate. Enough data may be utilized to generate a sufficiently accurate curve first for a desired level of accuracy in both scan dimensions. In some systems this may include 30-80 total incidence angles probed.

There are a number of shortcomings with conventional solutions. Conventional measurement of a tilt angle of substrate structures may be time consuming. Between scattering measurements, the substrate is moved relative to the X-ray source, relative to the detection apparatus, etc. Relative motion of the substrate includes motor acceleration, motor deceleration, motion stabilization, etc. Each movement of the substrate relative to the measurement apparatus may substantially increase an amount of time spent in measurements to determine a substrate structure angle.

Some solutions further include collecting a volume of data that is not used for calculating a substrate structure tilt angle. Scattering data includes radial and angular detail that is not utilized in tilt angle calculations. Conventional solutions including total intensity integration include inefficiencies in measurement, data storage, data processing, etc.

Systems and methods of the present disclosure address the above and other shortcomings of conventional solutions. In some embodiments, a number of scattering measurements (SAXS measurements) of a substrate including structures are taken. The measurements may be taken at a set of incidence angles (e.g., various angles between X-ray incidence and a plane of the substrate). A small number of measurements may be taken, e.g., two to eight measurements. Scattering patterns are collected. Details of the scattering patterns may be utilized in determining a tilt angle of structures upon the substrate.

Scattering patterns are collected from a number of incidence angles. The incidence angles may be selected to be angularly independent, e.g., to vary along two orthogonal angular dimensions. Details of the scattering patterns (e.g., asymmetries of the scattering patterns) may be utilized in determining the incidence angles.

Scattering patterns may be separated into angular Fourier decomposition components. The angular Fourier decomposition may include separation of the scattering patterns into angular Fourier components of various orders, e.g., first order, second order, etc. Each order Fourier term of each incidence angle scattering pattern may indicate a tilt angle of structures on the surface of the substrate.

In some embodiments, an averaging strategy may be utilized in determining a structure tilt angle. An averaging strategy may include calculating a tilt angle of substrate structures based on each of one or more Fourier components of each scattering pattern. In some embodiments, an average is found between each of these tilt angles to determine a measured tile angle of substrate structures.

In some embodiments, an intersection strategy may be utilized in determining a structure tilt angle. In an intersection strategy, a guess tilt angle may be utilized. An error term may be defined based on the guess tilt angle. The error term may include a sum over the scattering images, a sum over the Fourier terms, etc. The error term may be minimized to determine a tilt angle of structures of the substrate.

Methods and systems of this disclosure provide technical advantages over conventional solutions. Determining a structure tilt angle on a substrate may include collecting scattering patterns from a number of incidence angles. The number of incidence angles may be quite small compared to conventional methods. A decrease in incidence angles may decrease measurement time, increase measurement throughput, etc.

Receiving data from fewer incidence angles may reduce data load compared to conventional methods. Less data may be collected, transferred, stored, analyzed, etc. This may reduce computing load, data storage and transfer load, etc., compared to collecting data from a larger number of incidence angles, as in conventional methods of substrate structure tilt measurement.

Improving an accuracy and/or rate of determination of structure tilt angle may improve a substrate processing system. For example, one or more corrective actions may be performed in view of the determined structure tilt angle. Further processing operations for the substrate may be adjusted based on the structure tilt angle. For example, target processing operations of later operations on the measured substrate may be adjusted to improve processing at the measured structure tilt angle. Process parameters of etch processes (e.g., set points of one or more components for determining properties of an etch plasma) may be adjusted in view of a measured structure tilt angle. By adjusting later processing operations of a substrate processing procedure based on a determined structure tilt angle, a substrate processing system may increase a likelihood of producing a substrate meeting one or more target threshold property values. In some embodiments, a process recipe may be updated based on a structure tilt angle measurement. For example, a measured structure tilt angle may be outside a target threshold range, and a processing recipe may be updated to adjust a tilt angle of future substrate structures to be within the target threshold range. By adjusting a processing recipe, a substrate processing system may increase a likelihood of producing substrates meeting target performance thresholds, which may decrease costs associated with producing, identifying, and discarding of defective products. Substrates outside an acceptable range of property values may be efficiently identified. For example, a substrate with a structure tilt angle outside a threshold range may be quickly and accurately identified, and further processing operations may not be performed, reducing cost of energy, material, time, environmental impact, etc., of continued processing of a substrate that is predicted to have property values outside target ranges. In some embodiments, tilt angle data may be used to verify accuracy, reliability, repeatability, or the like, of a process step, operation, substrate design, etc.

In some aspects of the present disclosure, a method includes receiving, by a processing device, a first small angle scattering image of a substrate. The substrate includes a number of structures oriented at a first angle relative to a base of the substrate. The first small angle scattering image of the substrate is collected at a second angle of incidence of radiation relative to the base of the substrate, different than the first angle. The method further includes determining a first-order Fourier term associated with the first small angle scattering image by performing angular Fourier decomposition of the first small angle scattering image. The method further includes determining a value of the first angle based on the first-order Fourier term.

In another aspect of the present disclosure, a system includes memory and a processing device coupled to the memory. The processing device is configured to receive a first small angle scattering image of a substrate. The substrate includes a number of structures oriented at a first angle relative to a base of the substrate. The first small angle scattering image of the substrate is collected at a second angle of incidence of radiation relative to the base of the substrate, different than the first angle. The processing device is further configured to determine a first-order Fourier term associated with the first small angle scattering image by performing angular Fourier decomposition of the first small angle scattering image. The processing device is further configured to determine a value of the first angle based on the first-order Fourier term.

In another aspect of the present disclosure, a non-transitory machine-readable storage medium stores instructions which, when executed, cause a processing device to perform operations including receiving a first small angle scattering image of a substrate. The substrate includes a number of structures oriented at a first angle relative to a base of the substrate. The first small angle scattering image of the substrate is collected at a second angle of incidence of radiation relative to the base of the substrate, different than the first angle. The operations further include determining a first-order Fourier term associated with the first small angle scattering image by performing angular Fourier decomposition of the first small angle scattering image. The operations further include determining a value of the first angle based on the first first-order Fourier term.

FIG. 1 is a schematic diagram of a system 100 for measurement and analysis of X-ray scattering from a substrate 102, according to some embodiments. System 100 may be utilized in performing small angle X-ray scattering. System 100 may be utilized in determining properties of a substrate. System 100 may be utilized in determining tilt angle of structures of a substrate.

Substrate 102 may be mounted on a mounting assembly 104. Mounting assembly 104 may rotate, e.g., relative to incident X-rays 106. Mounting assembly 104 may enable exposure of substrate 102 to X-rays 106 at a range of incidence angles. Mounting assembly 104 may be rotatable in two dimensions, e.g., around an axis perpendicular to the plane of FIG. 1 (as shown by the curved arrow) and around an axis in the plane of FIG. 1 (not shown). Mounting assembly 104 may be rotatable in orthogonal dimensions. Mounting assembly 104 may be rotatable around two different axes.

An X-ray source 108 provides X-rays 106 to substrate 102. X-ray source 108 may generate a collimated beam of X-rays. X-ray source 108 may generate a focused beam of X-rays. X-ray source 108 may generate a converging X-ray beam. X-ray source 108 may include X-ray tube 110 and one or more optical components 112 (e.g., for beam shaping).

Upon interaction of X-rays 106 with substrate 102, some scattering of the incident beam occurs. A scattered beam 114 is generated, which encodes information about dimensions of the substrate 102, including tilt angle between structures upon substrate 102 and the base of substrate 102.

Scattered beam 114 may be provided to detector assembly 116. Detector assembly 116 may include a detector array 118. Detector array 118 may provide spatial resolution of X-ray energy received by detector assembly 116. Detector array 118 may distinguish between angular components of scattered beam 114. Details in differences of response of various elements of detector array 118 may be utilized in determining a tilt angle of structures of substrate 102.

A set of incidence angles may be utilized in determining a tilt angle of structures of a substrate. The set of incidence angles may include incidence angles intended to generate a clear intersection point of the tilt angle. For example, a substrate with a target or expected tilt angle (often perpendicular to the base of the substrate) may be measured at a set of incidence angles surrounding the expected tilt angle, such that calculated directional changes from incidence angles to the expected tilt angle intersect between the incidence angles. Angles of incidence used to generated scattering images is discussed in more detail in connection with FIG. 3.

Scattering patterns received by detector array 118 may be utilized in determining a tilt angle of structures of a substrate. Angular Fourier decomposition of scattering patterns may indicate the tilt angle of structures of the substrate.

Various operations associated with system 100 may be controlled by one or more processing devices, e.g., computing devices. Operations may be executed by purpose-built hardware, general computing devices, computing devices executing purpose-built software, etc. Operations may be performed by devices including computing devices such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. Devices for performing operations of system 100 may receive user input (e.g., via a graphical user interface (GUI) displayed via the one or more devices). Devices of system 100 may perform operations associated with small angle scattering measurements, data analysis, corrective action recommendation and/or performance, etc.

System 100 includes control unit 120, including a processing device control processor 122 and control memory 124. Control unit 120 is communicatively coupled to one or more components of system 100 for control of components of the system. Control unit 120 may be communicatively coupled, for example, with X-ray tube 110, mounting assembly 103, etc.

System 100 includes analysis unit 130, including a processing device (analysis processor 132) and memory (analysis memory 134). Analysis unit 130 may perform operations associated with receiving data generated by components of system 100 and performing analysis on the data. Analysis processor 132 may perform Fourier decomposition of small angle scattering images. Analysis processor 132 may predict tilt angles of structures of a substrate based on small angle scattering measurements generated by components of system 100.

Operations may be executed by more or fewer devices than described in connection with FIG. 1. For example, operations of control processor 122 and analysis processor 132 may be performed by the same device, or more than two devices may perform operations attributed to control unit 120 and analysis unit 130.

Figure 2:
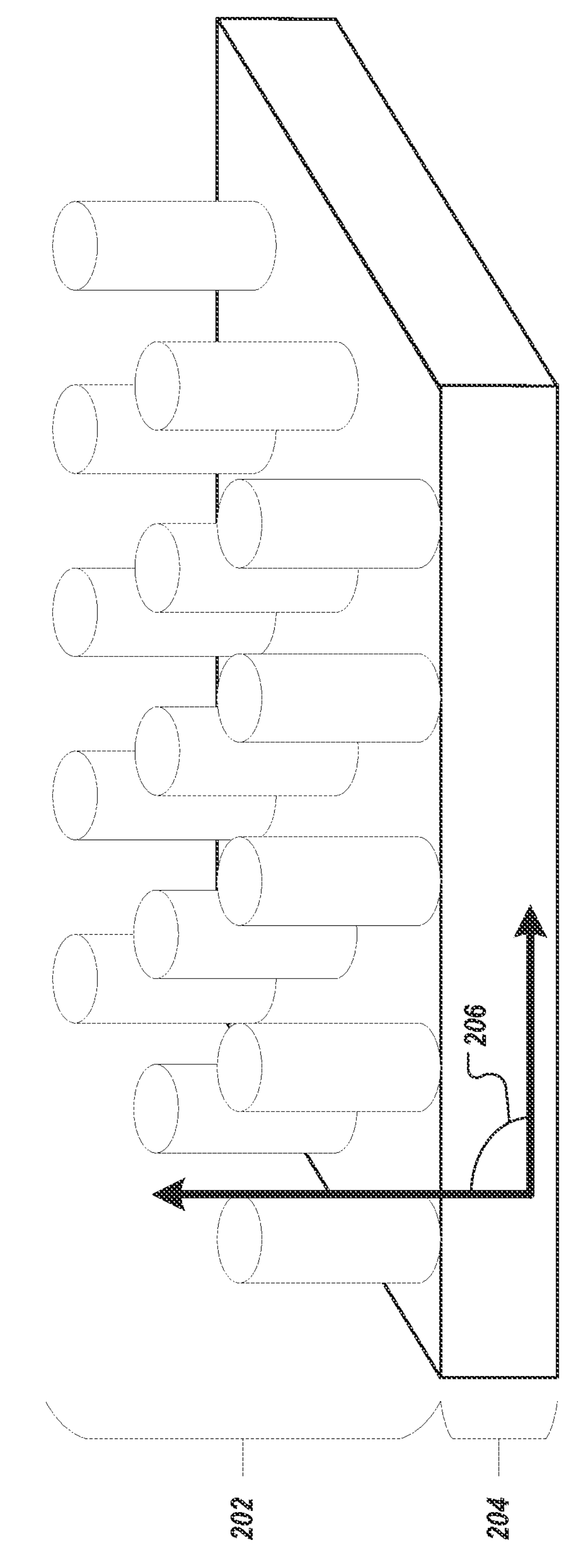
FIG. 2 is a diagram depicting tilt angle of structures of a substrate, according to some embodiments.

FIG. 2 is a diagram depicting tilt angle of structures of a substrate 200, according to some embodiments. Substrate 200 may include an array of structures 202. Substrate 200 may further include substrate base 204.

Structures of array of structures 202 may be at some tilt angle 206. Tilt angle 206 may be measured relative to a surface of the substrate. Tilt angle 206 may be measured relative to a surface a substrate base 204. Tilt angle 206 may be measured relative to a plane defined by portions of substrate base 204.

Substrate 200 may be manufactured with a target tilt angle. The target tilt angle may be 90°, as shown in FIG. 2. Array of structures 202 may have a different tilt angle than the target tilt angle. Deviations in tilt angle from a target tilt angle may be caused by inconsistencies in manufacturing equipment performance, sub-optimal recipe design, sub-optimal process chamber constants/settings, etc. In some cases, tilt angles of individual structures of array of structures 202 may be approximately the same (e.g., within 0.1 degrees). Determining a tilt angle value may include determining an average tilt value of a probed region of a substrate.

Figure 3:
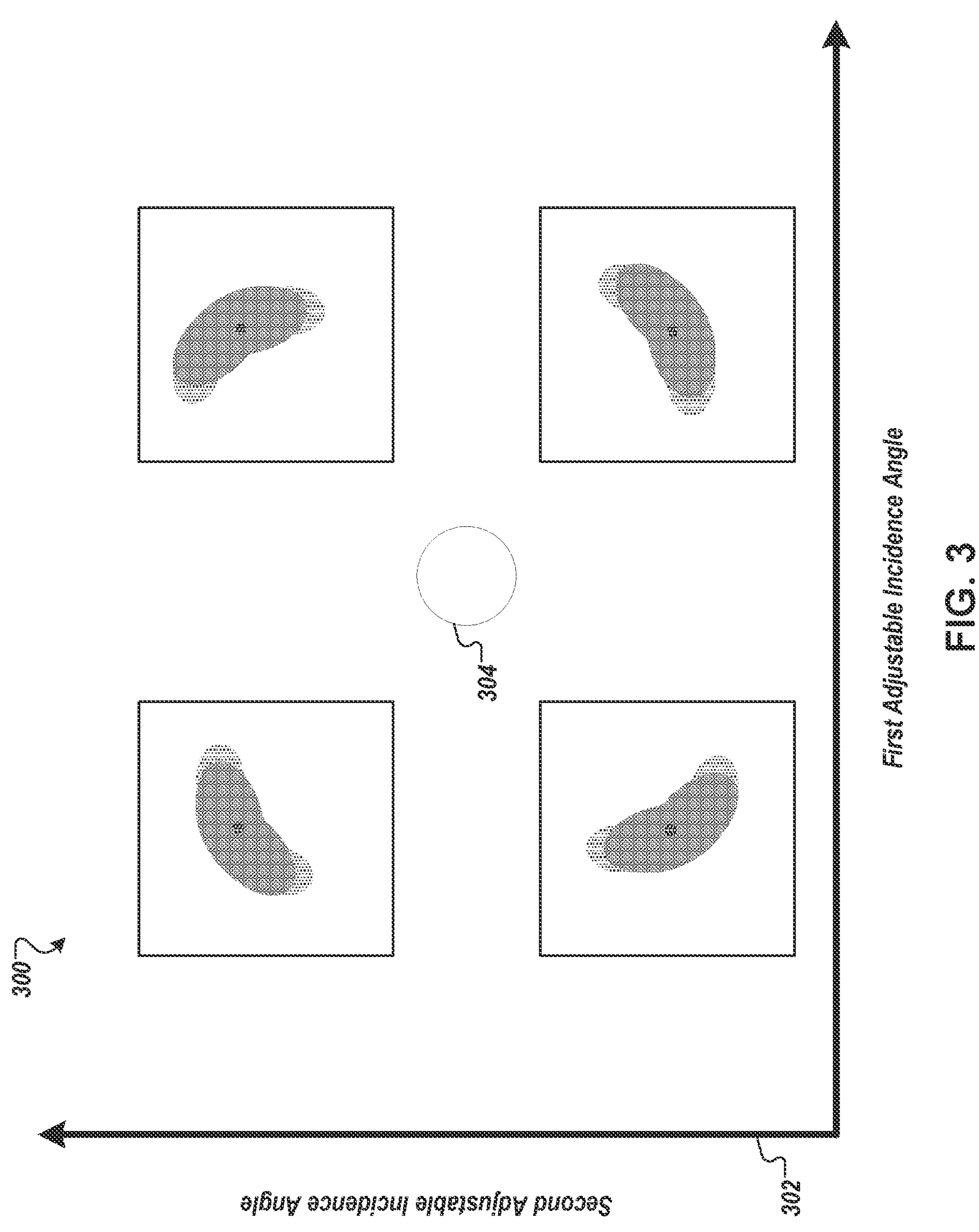
FIG. 3 is a diagram depicting example scattering patterns taken from a set of incidence angles, according to some embodiments.

FIG. 3 is a diagram depicting example scattering patterns 300 taken from a set of incidence angles, according to some embodiments. Scattering patterns 300 are displayed on axes 302. The axes are correlated to angles of an adjustable mounting assembly supporting a substrate during substrate structure tilt angle measurements. The angles correspond to adjusting an angle of the mounting assembly to adjust an incidence angle of X-rays used in substrate structure tilt angles. The first adjustable incidence angle and second adjustable incidence angle may be independent, orthogonal, etc.

A small number of incidence angles (e.g., one to eight) may be utilized in determining the tilt angle of substrate structures. Four scattering patterns 300 are shown as an example arrangement of adjustable incidence angle measurements in FIG. 3.

In some embodiments, each scattering pattern may include one or more indications of a tilt angle of structures of a measured substrate. Angular Fourier decomposition components of a scattering pattern may include indications of the tilt angle of structures of a measured substrate. Measurement incidence angles may be chosen such that the set of measurement angles and a predicted structure tilt angle are not colinear when expressed as ordered pairs of the first angle and the second angle. For example, if a predicted structure tilt angle is within a range of solid angles corresponding to angle space region 304, measurement angles may be selected such that the measurement angles and predicted structure tilt angle are not colinear. Measurement angles may be selected such that if one measurement angle is coincident with a structure tilt angle, at least two other measurement angles are not colinear with the structure tilt angle. Measurement angles may be selected such that the measurements are taken at incidence angles displaced in multiple directions from an expected tilt angle. A set of measurement angles may be displaced equivalently from an expected structure tilt angle. For example, ordered pairs representing the values of the first and second adjustable incidence angles compared to an expected tilt angle may vary by some standard value. Ordered pairs of measurement angles for four measurement positions may be selected to be (0, x), (0, −x), (x, 0), and (−x, 0), where x represents a target angular displacement. Ordered pairs of measurement angles may be as shown in FIG. 3, (x, x), (x, −x), (−x, x), and (−x, −x), where x represents a target angular displacement in one angular dimension. In an example system, x may represent half a degree of tilt, and four measurements may be taken at angular ordered pairs (0.5, 0.5), (0.5, −0.5), (−0.5, 0.5), and (−0.5, −0.5), expressing in degrees of tilt compared to a baseline tilt orientation. In some embodiments, various angles of measurement may not conform to these values, e.g., measurement angles may not be evenly spaced around an expected structure tilt angle, a different set of angles or criteria for angle selection may be utilized, etc.

One or more of the scattering patterns 300 may be subject to Angular Fourier decomposition. Angular Fourier decomposition may be similar to Fourier techniques used in image processing. Angular Fourier decomposition may include decomposition of a scattering pattern into circularly periodic component functions. Angular Fourier decomposition may include determining an amplitude and phase of a first-order Fourier component (e.g., a frequency of the component function is such that a single wavelength corresponds to 360° around a central portion of the scattering pattern). Angular Fourier decomposition may include determining an amplitude and phase of a second-order Fourier component (e.g., a component with a frequency of the component function such that two wavelengths of the function corresponds to 360°). Angular Fourier decomposition may include determining an amplitude and phase of further Fourier component orders, e.g., third order, fourth order, etc.

In some embodiments, data processing to determine a structure tilt angle may include preprocessing. Preprocessing of data may include outlier removal. Outliers may include unusual pixel data values, unusual scattering patterns, etc. Outliers may be rejected based on being more than a number of standard deviations away from an average or expected value, e.g., a local average of intensity values of pixels in the vicinity of a potential outlier pixel. Excluded pixels may be removed from consideration. Excluded pixels may be replaced with a local average, a value to generate a local smooth function, etc. Excluded scattering images may be removed from consideration of the tilt angle.

In some embodiments, a central area of the scattering image may be removed from consideration. For example, the central area may correspond to X-ray energy that passed directly through the substrate, and may not provide scattering information. A circular block may be applied, e.g., to a center of the diffraction pattern defined by a weighted average of scattered intensity. In some embodiments, preprocessing may include scaling. Scaling may emphasize importance of data points closer to the center of the scattering pattern. One possible scaling function is $$I' = \frac{I_0}{\sqrt{1 + I_0}},$$

where I' is the scaled intensity and $I_0$ is the measured intensity.

Fourier decomposition may include calculating an overlap between measured intensity and a set of Fourier component terms. Fourier decomposition may include evaluating an overlap angle between measured intensity and each of a set of Fourier component terms. An overlap integral to determine a Fourier component term may be of the form $$V_n = \int_0^{X_{max}} \int_0^{Y_{max}} I' \times e^{\vartheta(x,y) i \times n} dy dx$$

$$\vartheta(x, y) = \arctan\left(\frac{y - c_y}{x - c_x}\right)$$

where I' is the scaled intensity, θ is the angular coordinate, $V_n$ is the amplitude of the target Fourier component in the decomposition, $X_{max}$ and $Y_{max}$ correspond to a spatial extent of the diffraction image (e.g., pixel count along the x- and y-axis), θ(x, y) is a function calculated for each pixel, $c_x$ and $c_y$ correspond to the center of the diffraction pattern in the image (e.g., in pixel coordinates), and n is an integer corresponding to the order of the Fourier component. The center point of the diffraction pattern may be determined or calibrated based on the diffraction image of the direct beam, with no sample or beam blocker.

Fourier components may be associated with vector representations. A direction of a vector representation may correlate to a direction toward the tilt angle of a structure (e.g., compared to the incidence angle associated with the scattering pattern resulting from measurement of the substrate). A magnitude of the vector representation may correlate with a difference between the measurement angle and the structure tilt angle. In some embodiments, a phase of a Fourier term may determine an angle of tilt of structures of the surface, relative to the probing angle (e.g., measurement angle). An amplitude of the Fourier term may correspond to a confidence that the bearing is correct.

A Fourier component of an angular Fourier decomposition of a scattering image may correspond to multiple vectors. A first order Fourier component may correspond to one vector. A second order Fourier component may correspond to two vectors, e.g., pointing in opposite directions. A third order Fourier component may correspond to three vectors, pointing 120° apart, etc. In some embodiments, directions of vectors associated with Fourier components may correspond to amplitude peaks in the Fourier components. In some embodiments, directions of vectors associated with Fourier components may be aligned with other portions of the Fourier components, such as troughs or zero-crossings. Determining structure tilt angle based on Fourier decomposition of image data may include correction factors (e.g., on a per-order basis) to ensure correct phases are aligned for determining tilt angle.

An averaging based model may be utilized to determine a tilt angle from vectors of Fourier components of an angular Fourier decomposition of a scattering pattern. A vector for each order most likely to correspond to the direction of the structure tilt angle may be determined. Determination of the proper vector from each Fourier component may be performed by determining which vector is most likely based on other vectors of the same scattering image. Determination of the proper vector from each Fourier component may be based on vectors of other scattering images of the same substrate. Determination of which vectors from a set of Fourier components of a scattering image may be based on magnitudes of combinations of vectors associated with the scattering image. For example, the first order vector may be added to each of the two second order vectors. The resultant vector with the larger magnitude may be considered to be associated with the correct second order vector. Vector magnitude may be correlated to a tilt magnitude (e.g., by calibration against one or more known samples). An average tilt corresponding to each of a set of Fourier components from each of a set of scattering patterns may be utilized to determine the tilt angle of structures of the substrate.

An intersection based model may be utilized to determine a tilt angle. The intersection model may include determining an intersection point of vector directions indicated by multiple scattering patterns associated with multiple measurement incidence angles. The intersection model may determine a best or average intersection point of vectors indicating a structure tilt angle.

In some embodiments, an error-based model may be utilized in determining a structure tilt angle from scattering patterns. A guess for the structure tilt angle may be determined. The guess may be random, may be the expected tilt angle, etc. An error function may be defined and evaluated at the guess value. The error function may include a sum over Fourier orders. The error function may include a sum over scattering patterns. The error function may include a term that reduces weight of scattering patterns associated with measurement angles close to the tilt angle (e.g., to reduce noise of the intersection based model). In some embodiments, scattering data taken at incidence angles near the structure tilt angle (e.g., within a threshold angular distance from the structure tilt angle as predicted by other scattering images from other incidence angles) may be rejected from calculations in an intersection based tilt angle determination.

A simple example error term may be of the form $$E = \sum_{A_I}\sum_{F}(\vartheta_{Guess} - \vartheta_{Obs})^2,$$

where E is the error, $A_i$ is the angle of incidence of the scattering images, F is the calculated Fourier components of the Fourier decomposition of the scattering image, $\theta_{Guess}$ is the guess of the tilt angle, and $\theta_{obs}$ is the calculated tilt angle based on the Fourier decomposition. An error term may provide better performance with additional components. For example, a more complex error term may be of the form $$E = \sum_{A_I}\sum_{F}\frac{(\vartheta_{Guess} - \vartheta_{Obs})^2}{C + |\vartheta_{Guess} - \vartheta_{Obs}|},$$

where E is the error, $A_i$ is the angle of incidence of the scattering images, F is the calculated Fourier components of the Fourier decomposition of the scattering image, $\theta_{Guess}$ is the guess of the tilt angle, $\theta_{obs}$ is the calculated tilt angle based on the Fourier decomposition, and C is a cutoff term designed to reduce impact of scattering images taken at angles of incidence too close to the structure tilt angle for the data to be meaningful. This second error term may improve performance by deemphasizing scattering images with angles of incidence close to the tilt angle of structures of the substrate, and be deemphasizing the contribution of large tilt angles to the error term compared to a simple error term.

The error term may be minimized utilizing any convenient minimization procedure. The minimization procedure may include an exhaustive search of possible tilt angle guesses. The minimization procedure may include a genetic minimization operation. Any other type of minimization procedure may be utilized to find a tilt angle with the minimum error term. The tilt angle that minimizes the error term may be the calculated tilt angle of structures of the substrate.

Figure 4:
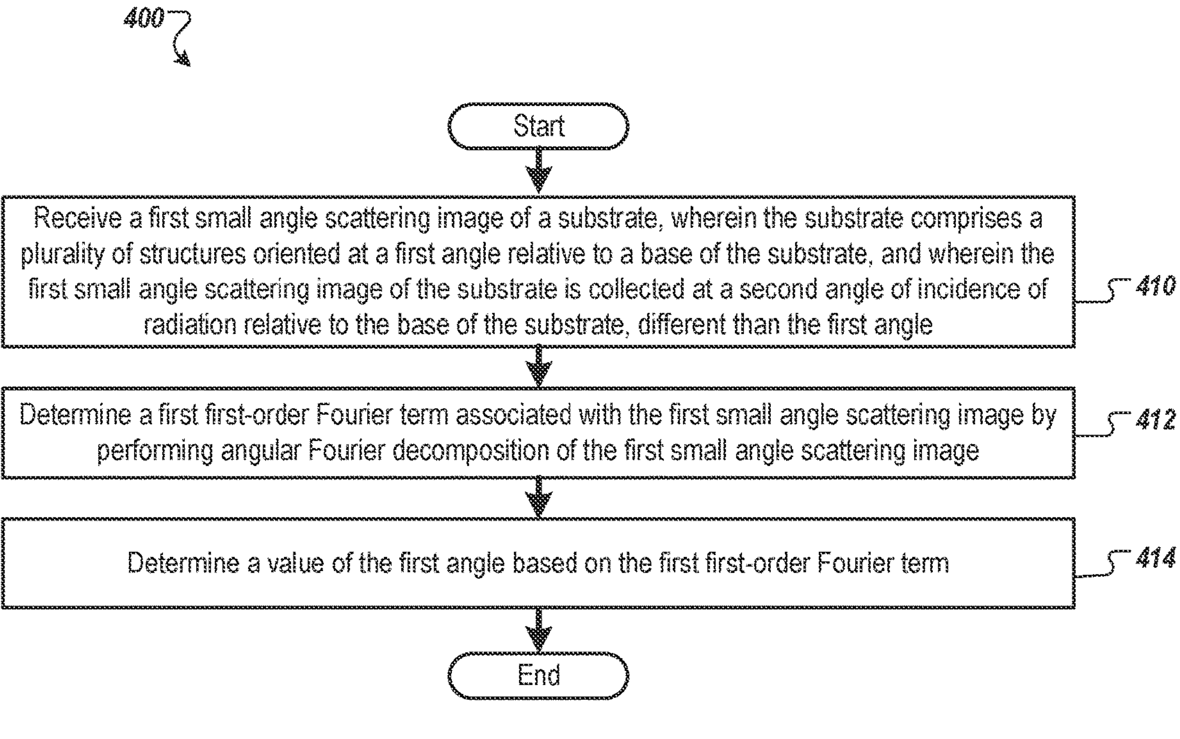
FIG. 4 is a flow diagram of a method for determining tilt angle of structures of a substrate, according to some embodiments.

FIG. 4 is a flow diagram of a method 400 for determining tilt angle of structures of a substrate, according to some embodiments. Method 400 may be performed by processing logic that may include hardware (circuitry, dedicated logic, etc.), software (e.g., instructions run on a processing device), or a combination thereof. In one implementation, some or all the operations of method 400 may be performed by one or more components of system 100 of FIG. 1. In some embodiments, one or more operations of method 400 may be performed by processing devices depicted in FIG. 1. Operations of method 400 may be performed by analysis processor 132 of analysis unit 130 of FIG. 1.

At block 410, processing logic receives a first small angle scattering image of a substrate. The substrate includes a number of structures oriented at a first angle relative to a base of the substrate. The first small angle scattering image of the substrate is collected at a second angle of incidence of radiation relative to the base of the substrate, different than the first angle.

In some embodiments, a second small angle scattering image may be received. The second small angle scattering image may be of the same substrate. The second small angle scattering image may be collected at a third angle of incidence of radiation relative to the base of the substrate, different than the second angle.

At block 412, processing logic determines a first first-order Fourier term associated with the first small angle scattering image by performing angular Fourier decomposition of the first small angle scattering image. Processing logic may further determine a first second-order Fourier term associated with the first small angle scattering image. Processing logic may further determine a second first-order Fourier term associated with the second small angle scattering image. Processing logic may further determine a second second-order Fourier term associated with the second small angle scattering image.

At block 414, processing logic determines a value of the first angle based on the first first-order Fourier term. Determining the first angle (e.g., the orientation of structures relative to the substrate base) may be further based on the second first-order Fourier term. Determining the first angle may be further based on the first second-order Fourier term. Determining the first angle may be further based on the second second-order Fourier term.

Determining the first angle may include generating a vector representation corresponding to one or more Fourier terms. Determining the first angle may include generating a vector representation corresponding to one or more of the first first-order Fourier term, the second first-order Fourier term, the first second-order Fourier term, or the second second-order Fourier term. Determining the first angle may further include determining which component of each vector representation to utilize in determining the first angle. Second-order Fourier terms may be associated with two vectors, one of which may be used in determining the first angle. Determining the first angle may include determining a first additive combination of vectors associated with the first small angle scattering image. The first additive combination of vectors may include a vector associated with the first first-order Fourier term and the first second-order Fourier term. The additive combination of vectors may include one vector each from each Fourier term of the first small angle scattering image that is to be used in determining the first tilt angle. The first additive combination of vectors may be selected such that it has the largest magnitudes of all possible additive combinations of vectors which include one vector from each Fourier term of the first small angle scattering image that is to be used in determining the first tilt angle. Determining the first angle may further include determining a second additive combination of vectors associated with the second small angle scattering image. The second additive combination of vectors may be generated in a similar way to the first additive combination of vectors. Determining the first angle may further include determining a first tilt angle indicated by the first additive combination of vectors. Determining the first angle may further include determining a second tilt angle associated with the second additive combination of vectors. Determining the value of the first angle may be based on the first tilt angle and the second tilt angle.

In some embodiments, determining a value of the first angle may further include determining a guess value for the value of the first angle. Determining a value of the first angle may further include determining an error based on the guess value. Determining a value of the first angle may include determining an error based on the guess value for each of a number of small angle scattering images. Determining a value of the first angle may include determining an error based on the guess value for each of a number of Fourier components. Determining a value of the first angle may include determining an error based on the guess value for each of a number of Fourier components for each of a number of small angle scattering images. Determining a value of the first angle may include determining a first error based on the guess and the first first-order Fourier term, a second error based on the guess value and the first second-order Fourier term, a third error based on the guess value and the second first-order Fourier term, and a fourth error based on the guess value and the second second-order Fourier term. Determining the value of the first angle may include determining an optimized value for the first angle that minimizes a combined error term. Determining the value of the first angle may include determining an optimizes value that minimizes a sum of the individual errors. The error determination may include determining a scaling term. The error determination may include determining a cutoff term. The cutoff term may reduce the weight of data associated with a small angle scattering image if the incidence angle of the small angle scattering image is similar to the first angle. The cutoff term may reduce the weight of data associated with the second small angle scattering image of the substrate if the first angle is similar to the third angle (e.g., within a threshold).

Figure 5:
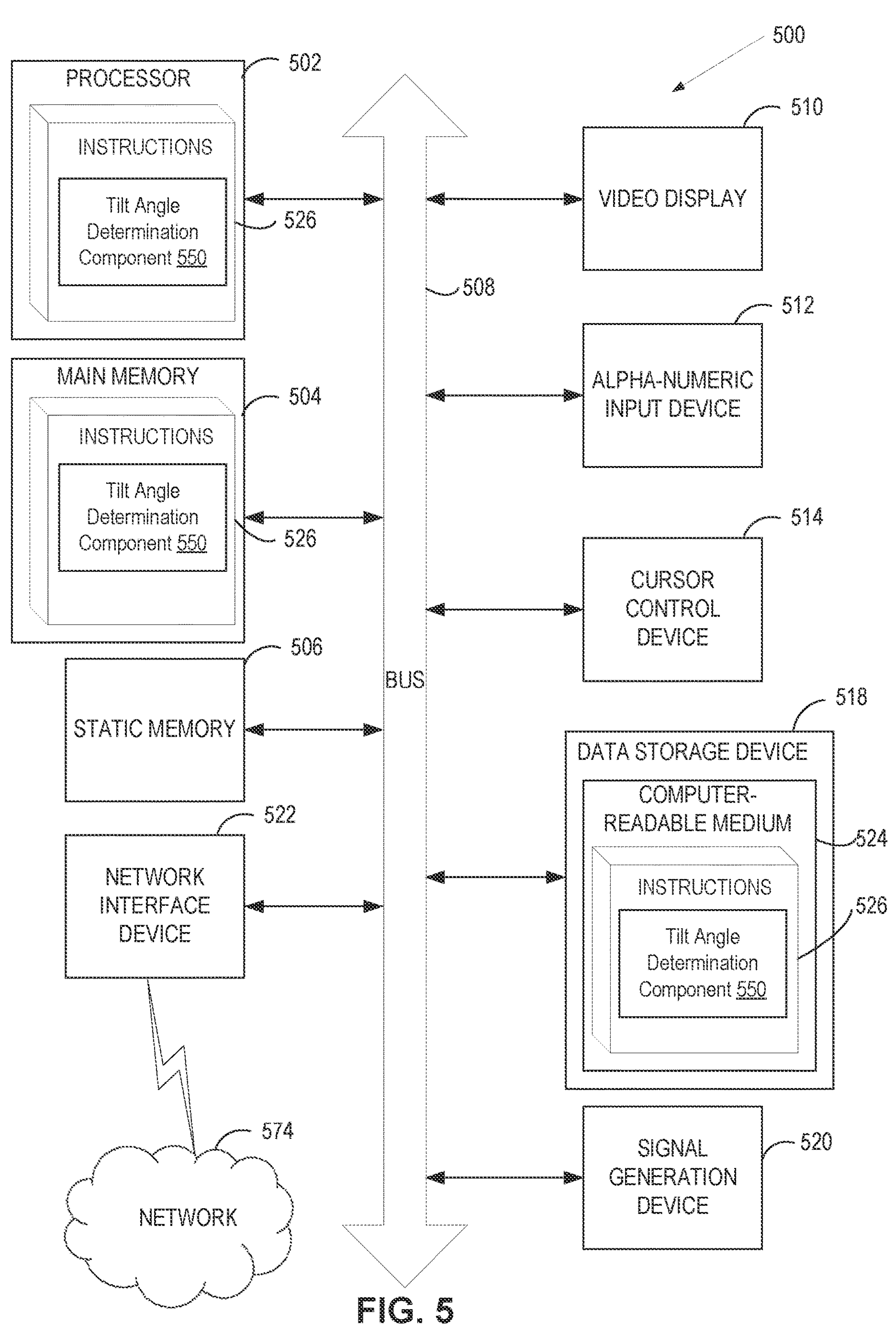
FIG. 5 is a block diagram illustrating a computer system, according to some embodiments.

FIG. 5 is a block diagram illustrating a computer system 500, according to some embodiments. In some embodiments, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., Random Access Memory (RAM)), a non-volatile memory 506 (e.g., Read-Only Memory (ROM) or Electrically-Erasable Programmable ROM (EEPROM)), and a data storage device 518, which may communicate with each other via a bus 508.

Processing device 502 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 500 may further include a network interface device 522 (e.g., coupled to network 574). Computer system 500 also may include a video display unit 510 (e.g., an LCD), an alphanumeric input device 512 (e.g., a keyboard), a cursor control device 514 (e.g., a mouse), and a signal generation device 520.

In some embodiments, data storage device 518 may include a non-transitory computer-readable storage medium 524 (e.g., non-transitory machine-readable medium) on which may store instructions 526 encoding any one or more of the methods or functions described herein, including instructions encoding components associated with performing operations described in connection with FIGS. 3-4 and for implementing methods described herein. Instructions 526 may include a tilt angle determination component 550, for determining tilt angle of structures of a substrate.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "reducing," "generating," "correcting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second." "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method, comprising:

receiving, by a processing device, a first small angle scattering image of a substrate, wherein the substrate comprises a plurality of structures oriented at a first angle relative to a base of the substrate, and wherein the first small angle scattering image of the substrate is collected at a second angle of incidence of radiation relative to the base of the substrate, different than the first angle;

determining, by the processing device, a first first-order Fourier term associated with the first small angle scattering image by performing angular Fourier decomposition of the first small angle scattering image;

determining, by the processing device, a first second-order Fourier term by performing angular Fourier decomposition of the first small angle scattering image; and determining, by the processing device, a value of the first angle based on the first first-order Fourier term and the first second-order Fourier term.

2. The method of claim 1, further comprising determining a first second-order Fourier term by performing Fourier decomposition on the first small angle scattering image, wherein determining the value of the first angle is further based on the first second-order Fourier term.

3. The method of claim 1, further comprising:

receiving a second small angle scattering image of the substrate, wherein the second small angle scattering image of the substrate is collected at a third angle of incidence of radiation relative to the base of the substrate; and determining a second first-order Fourier term by performing angular Fourier decomposition of the second small angle scattering image, wherein determining the value of the first angle is further based on the second first-order Fourier term.

4. The method of claim 3, further comprising:

determining a second second-order Fourier term by performing angular Fourier decomposition of the second small angle scattering image, wherein determining the value of the first angle is further based on the second second-order Fourier term.

5. The method of claim 4, further comprising:

generating a vector representation of each of:

the first first-order Fourier term, the first second-order Fourier term, the second first-order Fourier term, and the second second-order Fourier term;

determining a first additive combination of vectors associated with the first small angle scattering image, wherein the first additive combination of vectors includes one vector component from each of the first first-order Fourier term and the first second-order Fourier term, and wherein the first additive combination of vectors has a largest magnitude of all additive combinations of vectors which include one vector component from each of the first first-order Fourier term and the first second-order Fourier term;

determining a second additive combination of vectors associated with the second small angle scattering image, wherein the second additive combination of vectors includes one vector component from each of the second first-order Fourier term and the second second-order Fourier term, and wherein the second additive combination of vectors has a largest magnitude of all additive combinations of vectors which include one vector component from each of the second first-order Fourier term and the second second-order Fourier term;

determining a first tilt angle associated with the first additive combination of vectors; and determining a second tilt angle associated with the second additive combination of vectors, wherein determining the value of the first angle is based on the first tilt angle and the second tilt angle.

6. The method of claim 4, further comprising:

determining a guess value for the value of the first angle;

determining an error based on the guess value for each of the first first-order Fourier term, the second first-order Fourier term, the first second-order Fourier term, and the second second-order Fourier term; and determining an optimized value of the first angle that minimizes a sum of the errors associated with the first first-order Fourier term, the first second-order Fourier term, the second first-order Fourier term, and the second second-order Fourier term.

7. The method of claim 6, wherein the error comprises a cutoff term that reduces a weight of data associated with the second small angle scattering image when a value of the third angle of incidence is within a threshold difference of the value of the first angle.

8. A system, comprising memory and a processing device coupled to the memory, wherein the processing device is configured to:

receive a first small angle scattering image of a substrate, wherein the substrate comprises a plurality of structures oriented at a first angle relative to a base of the substrate, and wherein the first small angle scattering image of the substrate is collected at a second angle of incidence of radiation relative to the base of the substrate, different than the first angle;

determine a first first-order Fourier term associated with the first small angle scattering image by performing angular Fourier decomposition of the first small angle scattering image;

determine a first second-order Fourier term by performing angular Fourier decomposition of the first small angle scattering image; and determine a value of the first angle based on the first first-order Fourier term and the first second-order Fourier term.

9. The system of claim 8, wherein the processing device is further to determine a first second-order Fourier term by performing Fourier decomposition on the first small angle scattering image, wherein determining the value of the first angle is further based on the first second-order Fourier term.

10. The system of claim 8, wherein the processing device is further to:

receive a second small angle scattering image of the substrate, wherein the second small angle scattering image of the substrate is collected at a third angle of incidence of radiation relative to the base of the substrate; and determine a second first-order Fourier term by performing angular Fourier decomposition of the second small angle scattering image, wherein determining the value of the first angle is further based on the second first-order Fourier term.

11. The system of claim 10, wherein the processing device is further to:

determine a second second-order Fourier term by performing angular Fourier decomposition of the second small angle scattering image, wherein determining the value of the first angle is further based on the second second-order Fourier term.

12. The system of claim 11, wherein the processing device is further to:

generate a vector representation of each of:

the first first-order Fourier term, the first second-order Fourier term, the second first-order Fourier term, and the second second-order Fourier term;

determine a first additive combination of vectors associated with the first small angle scattering image, wherein the first additive combination of vectors includes one vector component from each of the first first-order Fourier term and the first second-order Fourier term, and wherein the first additive combination of vectors has a largest magnitude of all additive combinations of vectors which include one vector component from each of the first first-order Fourier term and the first second-order Fourier term;

determine a second additive combination of vectors associated with the second small angle scattering image, wherein the second additive combination of vectors includes one vector component from each of the second first-order Fourier term and the second second-order Fourier term, and wherein the second additive combination of vectors has a largest magnitude of all additive combinations of vectors which include one vector component from each of the second first-order Fourier term and the second second-order Fourier term;

determine a first tilt angle associated with the first additive combination of vectors; and determine a second tilt angle associated with the second additive combination of vectors, wherein determining the value of the first angle is based on the first tilt angle and the second tilt angle.

13. The system of claim 11, wherein the processing device is further to:

determine a guess value for the value of the first angle;

determine an error based on the guess value for each of the first first-order Fourier term, the second first-order Fourier term, the first second-order Fourier term, and the second second-order Fourier term; and determine an optimized value of the first angle that minimizes a sum of the errors associated with the first first-order Fourier term, the first second-order Fourier term, the second first-order Fourier term, and the second second-order Fourier term.

14. The system of claim 13, wherein the error comprises a cutoff term that reduces a weight of data associated with the second small angle scattering image when a value of the third angle of incidence is within a threshold difference of the value of the first angle.

15. A non-transitory machine-readable storage medium storing instructions which, when executed, cause a processing device to perform operations comprising:

receiving a first small angle scattering image of a substrate, wherein the substrate comprises a plurality of structures oriented at a first angle relative to a base of the substrate, and wherein the first small angle scattering image of the substrate is collected at a second angle of incidence of radiation relative to the base of the substrate, different than the first angle;

determining a first first-order Fourier term associated with the first small angle scattering image by performing angular Fourier decomposition of the first small angle scattering image;

determining, by the processing device, a first second-order Fourier term by performing angular Fourier decomposition of the first small angle scattering image; and determining, by the processing device, a value of the first angle based on the first first-order Fourier term and the first second-order Fourier term.

16. The non-transitory machine-readable storage medium of claim 15, the operations further comprising determining a first second-order Fourier term by performing Fourier decomposition on the first small angle scattering image, wherein determining the value of the first angle is further based on the first second-order Fourier term.

17. The non-transitory machine-readable storage medium of claim 15, the operations further comprising:

receiving a second small angle scattering image of the substrate, wherein the second small angle scattering image of the substrate is collected at a third angle of incidence of radiation relative to the base of the substrate; and determining a second first-order Fourier term by performing angular Fourier decomposition of the second small angle scattering image, wherein determining the value of the first angle is further based on the second first-order Fourier term.

18. The non-transitory machine-readable storage medium of claim 17, the operations further comprising:

determining a second second-order Fourier term by performing angular Fourier decomposition of the second small angle scattering image, wherein determining the value of the first angle is further based on the second second-order Fourier term.

19. The non-transitory machine-readable storage medium of claim 18, the operations further comprising:

generating a vector representation of each of:

the first first-order Fourier term, the first second-order Fourier term, the second first-order Fourier term, and the second second-order Fourier term;

determining a first additive combination of vectors associated with the first small angle scattering image, wherein the first additive combination of vectors includes one vector component from each of the first first-order Fourier term and the first second-order Fourier term, and wherein the first additive combination of vectors has a largest magnitude of all additive combinations of vectors which include one vector component from each of the first first-order Fourier term and the first second-order Fourier term;

determining a second additive combination of vectors associated with the second small angle scattering image, wherein the second additive combination of vectors includes one vector component from each of the second first-order Fourier term and the second second-order Fourier term, and wherein the second additive combination of vectors has a largest magnitude of all additive combinations of vectors which include one vector component from each of the second first-order Fourier term and the second second-order Fourier term;

determining a first tilt angle associated with the first additive combination of vectors; and determining a second tilt angle associated with the second additive combination of vectors, wherein determining the value of the first angle is based on the first tilt angle and the second tilt angle.

20. The non-transitory machine-readable storage medium of claim 18, the operations further comprising:

determining a guess value for the value of the first angle;

determining an error based on the guess value for each of the first first-order Fourier term, the second first-order Fourier term, the first second-order Fourier term, and the second second-order Fourier term; and determining an optimized value of the first angle that minimizes a sum of the errors associated with the first first-order Fourier term, the first second-order Fourier term, the second first-order Fourier term, and the second second-order Fourier term.

* * * * *